C. S. KNAPP.
AUTOMATICALLY ADJUSTABLE BRAKE HEAD.
APPLICATION FILED MAR. 22, 1918.
1,282,860.
Patented Oct. 29, 1918.
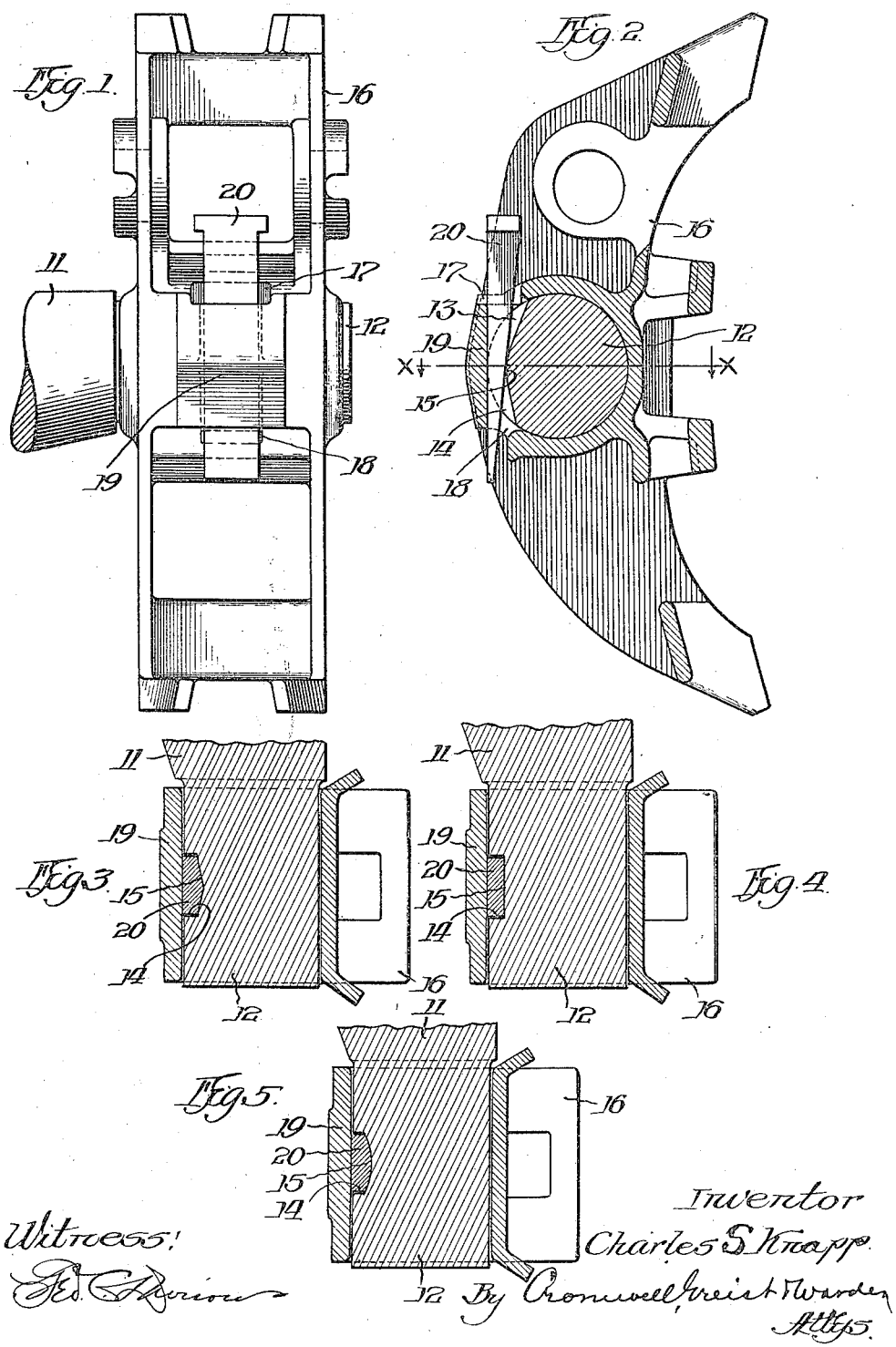

UNITED STATES PATENT OFFICE.

CHARLES S. KNAPP, OF CHICAGO, ILLINOIS.

AUTOMATICALLY-ADJUSTABLE BRAKE-HEAD.

1,282,860.  Specification of Letters Patent.  Patented Oct. 29, 1918.

Application filed March 22, 1918. Serial No. 223,896.

*To all whom it may concern:*

Be it known that I, CHARLES S. KNAPP, a citizen of the United States, residing at Chicago, in the county of Cook and State of Illinois, have invented certain new and useful Improvements in Automatically-Adjustable Brake-Heads, of which the following is a specification.

The primary object of the invention is the mounting of the brake head on the end of the brake beam in such manner as to prevent its displacement therefrom and to permit of automatic adjustment of the head thereon to the contact surface of the wheel under varying conditions, without unduly weakening the brake head support and at the same time insuring a dependably firm positioning of the head.

In practice, the suspension point of the brake hanger being a fixed one, the wear of the brake shoe and the turning down of the wheel bring about conditions effecting changes in the relation of the bearing faces of the shoe and wheel which are detrimental to efficiency.

In brake beams in common use at the present time, the head is fitted over the end of a cylindrically-shaped end portion of the brake beam. This cylindrical bearing portion or trunnion is grooved out all around for a considerable portion of its width for a spring-actuated block which, when the spring pressure is exerted on the block, keeps it in the groove and prevents the brake head from being withdrawn from the end of the trunnion. To remove the brake head from the trunnion the locking key must first be removed. The objection to such an arrangement principally is that the groove in the end of the trunnion materially reduces the bearing area between the trunnion and the brake head thus increasing the pressure per unit of area to such an extent that excessive wear is had on the head or trunnion and the brake heads as a consequence become loose. According to the present invention there is substituted for a circumferential groove in the bearing surface, a peculiar shaped notch or recess in the back portion of the trunnion, leaving a solid bearing surface between the brake beam trunnion and the brake head. After the brake head is applied to the end of the beam, a tapered key is inserted through alined apertures in the top and bottom walls of the brake head, the key fitting within the sides of a peculiarly shaped notch in the center of the brake beam trunnion. This notch has a convex center bearing surface with two diverging surfaces, which latter permit the necessary tilting of the brake head for adjustment to its bearing location with reference to the wheel surface.

Having a similar end in view, the permitting of the brake head to adjust itself to the wheel, various devices have been resorted to such as making the trunnion eccentric, or providing a crescent-shaped groove, with a flexible or spring key bearing either directly on the bottom of the groove in the trunnion or through a block resting therein, but in all such cases known to me, there is lacking the feature of the automatic adjustment coupled with a firm unyielding support for the brake head, and an avoidance of material weakening of the trunnion and head.

In order that the invention may be readily understood, a preferred embodiment thereof and slight modifications of the preferred embodiment are set forth in the following detailed description and in the drawing upon which said description is predicated. Obviously, however, the invention is susceptible of further modification without departure from its essence, wherefore the drawing and description are to be understood in an illustrative rather than in an unnecessarily limiting sense. In the drawings—

Figure 1 is a rear elevation of the brake head;

Fig. 2 is a vertical section through the head at right angles to the trunnion;

Figs. 3, 4 and 5 are horizontal sections on the line *x—x* of Fig. 2, these respective figures showing notches or grooves of slightly different cross section.

Having reference to the drawings more in detail, the brake beam is represented at 11 and its trunnion at 12. Two grooves 13 and 14, having intersecting axes obliquely disposed to the vertical in the same vertical plane, together form a substantially vertical notch or recess open at the rear side and widened at each end above and below, with a bottom convex at the intersection of the grooves to form a fulcrumal point 15, from which medial point the bottoms of the groove diverge upwardly and downwardly from a vertical axis of the notch. This groove may be of any suitable cross section, grooves of different cross section being shown for example in Figs. 3, 4 and 5.

The usual brake head indicated generally at 16 is fitted on said trunnion and has in its upper and lower walls opposed apertures 17 and 18 which aline with the upper and lower ends of the notch. The rear wall of the brake head connecting the apertures 17 and 18 and indicated at 19 presents a substantially vertical flat inner bearing face opposed to the fulcrumal bottom 15 of the notch.

A key 20, preferably rigid, is disposed within the apertures of the head and lies in the notch, with one side bearing on the fulcrumal point 15 and the opposite side bearing on the inner wall of the head throughout the vertical extent of the same.

From the foregoing it will be observed that, the trunnion 12 of the brake beam 11 maintaining a fixed position, the brake head 16 is free to rock upon the same at the fulcrumal point 15, the diverging bottoms of the two grooves forming the notch allowing an angular adjustment of the head until the key 20 contacts above or below the trunnion along the bottom of the notch. At the same time, it will be observed, that the brake head has a bearing upon the trunnion throughout practically the whole of its extent and is held firmly by reason of the extended bearing of the rear face of the key against the rear wall of the brake head. The taper of the key coöperates with the flat bearing face of the rear wall of the brake head and the point contact with the trunnion at the fulcrumal point to insure a tight fit at all times, preventing the brake head from becoming loose from the trunnion while at the same time permitting the brake head to accommodate itself to the contact surface of the wheel at all times.

I claim:

1. In combination, a brake beam trunnion provided on one side with a notch having in its medial bottom portion a convex fulcrum, a brake head fitted to and rocking on said fulcrum and having in its walls opposed apertures in alinement with the notch, the rear wall of the head presenting a bearing face opposed to the fulcrumal bottom of the notch, and a key disposed within the apertures of the head and lying in the notch with one side bearing on the fulcrumal point and the opposite side bearing on the inner wall of the head.

2. In combination, a brake beam trunnion provided on one side with a notch formed by two intersecting obliquely disposed grooves, the bottom of the notch thus presenting a medial convex fulcrum, a brake head fitted to and rocking on said fulcrum and having in its upper and lower walls opposed apertures in alinement with the notch, the rear wall of the head presenting a bearing face opposed to the fulcrumal bottom of the notch, and a key disposed within the apertures of the head and lying in the notch with one side bearing on the fulcrumal point and the opposite side bearing on the inner wall of the head throughout the vertical extent of the same.

3. In combination, a brake beam trunnion provided on that side opposite the wheel with a notch formed of two intersecting obliquely disposed grooves, the bottom of the notch thus presenting a medial convex fulcrum, a brake head fitted to and rocking on said fulcrum and having in its upper and lower walls opposed apertures in alinement with the notch, the inner face of the rear wall of the head presenting a substantially vertical flat bearing face opposed to the fulcrumal bottom of the notch, and a key disposed within the apertures of the head and lying in the notch with one side bearing on the fulcrumal point and the opposite side bearing on the inner wall of the head throughout the vertical extent of the same.

4. In combination, a brake beam trunnion provided on that side opposite the wheel with a notch formed of two intersecting obliquely disposed grooves, the bottom of the notch thus presenting a medial convex fulcrum, a brake head fitted to and rocking on said fulcrum and having in its upper and lower walls opposed apertures in alinement with the notch, the inner face of the rear wall of the head presenting a substantially vertical flat bearing face opposed to the fulcrumal bottom of the notch, and a rigid key disposed within the apertures of the head and lying in the notch with one side bearing on the fulcrumal point and the opposite side bearing throughout its operative length on the inner wall of the head.

5. In combination, a brake beam trunnion provided on one side only with a notch formed of two intersecting grooves obliquely disposed in a vertical plane, the bottom of the notch thus presenting a medial convex fulcrum, a brake head fitted to and rocking on said fulcrum and having in its upper and lower walls opposed apertures in alinement with the notch, the inner face of the rear wall of the head presenting a substantially vertical flat bearing surface opposed to the fulcrumal bottom of the notch, and a rigid taper key disposed within the apertures of the head and lying in the notch with one side bearing on the fulcrumal point and the opposite side bearing on the inner wall of the head throughout the vertical extent of the same.

In testimony whereof I have hereunto signed my name in the presence of two subscribing witnesses.

CHAS. S. KNAPP.

Witnesses:
H. F. SEIDLER,
A. A. MARTINSON.

Copies of this patent may be obtained for five cents each, by addressing the "Commissioner of Patents, Washington, D. C."